United States Patent [19]

Keener et al.

[11] Patent Number: 5,293,590
[45] Date of Patent: Mar. 8, 1994

[54] PERSONAL COMPUTER WITH INTERFACE CONTROLLER

[75] Inventors: Don S. Keener; Richard W. Voorhees, both of Boca Raton, Fla.

[73] Assignee: International Business Machines Corp., Armonk, N.Y.

[21] Appl. No.: 864,267

[22] Filed: Apr. 6, 1992

[51] Int. Cl.$^5$ .............................................. G06F 13/10
[52] U.S. Cl. ..................... 395/325; 395/275; 364/926.93; 364/927.97; 364/939.3; 364/DIG. 2
[58] Field of Search ............... 395/325, 725, 275, 425; 364/238.3, 239, DIG. 1, 926.93, 939.3, 927.97, DIG. 2

[56] References Cited

U.S. PATENT DOCUMENTS 4,864,532  9/1989  Reeve et al. ................... 395/250
4,965,801  10/1990 DuLac ........................... 371/40.1
5,034,914  7/1991  Osterlund ....................... 395/425

Primary Examiner—Michael R. Fleming
Assistant Examiner—Glenn A. Auve
Attorney, Agent, or Firm—Daniel E. McConnell

[57] ABSTRACT

This invention relates to personal computers and, more particularly, to a personal computer having an interface controller providing an economical way to achieve access to a direct access storage device by a small computer system interface. In accordance with this invention, the system CPU is selectively allowed to access all or only a portion of the internal registers in an interface controller, enabling implementation in conjunction with a conventional subsystem microprocessor interface to the registers if desired. With this change, either interface has full access to the interface controller's internal registers. By allowing such access, the number of component parts required can be reduced where multitasking possibilities are not desired, and the cost of providing SCSI capability significantly reduced.

6 Claims, 4 Drawing Sheets

PERSONAL COMPUTER WITH INTERFACE CONTROLLER

TECHNICAL FIELD

This invention relates to personal computers and, more particularly, to a personal computer having an interface controller providing an economical way to achieve access to a direct access storage device by a small computer system interface.

BACKGROUND OF THE INVENTION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor and associated volatile and non-volatile memory, a display monitor, a keyboard, one or more diskette drives, a fixed disk storage (also known as a direct access storage device or "DASD"), and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, L40SX, 50, 55, 56, 57, 65, 70, 80, 90 and 95.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 50 through 95. The Family I models typically have used the popular INTEL 8088 or 8086 microprocessor as the system processor. These processors have the ability to address one megabyte of memory. The Family II (and some Family I) models typically use the high speed INTEL 80286, 80386, and 80486 microprocessors which can operate in a real mode to emulate the slower speed INTEL 8086 microprocessor or a protected mode which extends the addressing range from 1 megabyte to 4 Gigabytes for some models. In essence, the real mode feature of the 80286, 80386, and 80486 processors provide hardware compatibility with software written for the 8086 and 8088 microprocessors.

In today's market, there is always the need for a less expensive way to implement necessary computer functions. Many personal computer users neither need nor are willing to pay for leading edge technology and speed. Rather, they are looking for the most inexpensive way to obtain computer tools. These users do not use multi-tasking operating systems; in fact, most use DOS. Since their requirements are simple, a low-cost solution is the most advantageous to them.

Small computer systems interface (or "SCSI") controllers (also known herein as "interface controllers") that have been implemented for controlling direct access storage devices (or "DASD") in Family II systems are very high in function, and support multiple operations concurrently. This was done to get the best performance possible out of multitasking operating systems. Of course, this performance costs money, and not every user wishes to pay for something he does not need or use. So, in order for products to be competitive in a market segment in which performance is not so critical, low cost solutions are required.

The preferred interface controller for a state of the art system is a high-integration, high-function solution. It typically uses an ASIC chip, a microprocessor, local ROM, local RAM, and an oscillator to drive the subsystem. The host system contains two BIOS ROMs, which contain CPU code to drive the subsystem, as well as code to drive other functions not related to the SCSI controller.

One large ASIC provides most of the hardware function of the SCSI controller subsystem. It has essentially three interfaces. One is to the system CPU's local processor bus. This is used to transfer data to and from the system, and allows the system to communicate with the main control registers. The second interface is to the local microprocessor which controls the low-level functions of the subsystem. Through this interface, all of the ASIC's registers can be read and written. Note that most of these registers are not accessible by the system CPU, since it does not need to control any of the low-level functions. Lastly, there is an interface to the SCSI bus, through which data and control signals pass to and from the various peripheral devices such as DASD.

The processor used as a sub-system processor in one example of such a design is an Intel 8032. The ROM contains microcode to drive the subsystem and the RAM is used for local storage. This allows all of the low-level processing work to be off-loaded from the main system CPU. The CPU gives complex commands to the subsystem, and the subsystem executes them in full and returns the data and results to the system. This design is considered ideal when multitasking is a requirement.

This and all other existing SCSI controllers interface to the system with a defined set of registers. These registers are fixed in both function and relative location, only the base address can vary from card to card. This architecture has become a de facto standard for Family II SCSI controllers and all existing designs follow this convention. The registers are as follows:

CIR Command Interface Register—This register communicates either a four byte immediate command, or the system memory address of a system control block (an "SCB") to be processed.

ATTN Attention Register—This register tells the subsystem to start a command.

BCR Basic Control Register—This register tells the subsystem to perform a reset, and enable or disable system interrupts or data transfer.

Interrupt Status Register—This register alerts the system that status is available for an outstanding command.

BSR Basic Status Register—This register has bits that provide the system with general status of the subsystem, such as, an interrupt is pending, or the Command Interface Register is full or empty.

Usually, these registers are not hard wired into the main functional logic of the SCSI controller, but rather provide "windows" through which the system CPU can talk to the subsystem microprocessor. Thus when the ATTN register is written to by the system, the ASIC generates an interrupt to the 8032. This interrupt tells the microprocessor that the registers have been loaded by the system. The microprocessor then reads the registers, interprets the high-level command that was issued, and performs the low-level operations necessary to process the command. Decisions to do retries, error recovery, or caching are done by the subsystem microprocessor, and then performed. When a command is complete, status is given back to the system CPU through one of the interface registers, or "windows". By writing back to these registers, the sub-system microprocessor causes an interrupt to be generated for the system CPU, indicating that the command is complete.

BRIEF DESCRIPTION OF THE INVENTION

With the foregoing as background, the present invention allows the main system CPU to access all of the internal registers in an interface controller. This can be implemented in conjunction with the existing subsystem microprocessor interface to the registers, or they can be exclusive and selectable by means of a mode pin. A mode pin is a pin that is tied to either +5 volts or Ground, and causes the chip to operate in one mode or the other continuously. With this change, either interface has full access to the interface controller's internal registers. By allowing such access, the number of component parts required can be reduced where multitasking possibilities are not desired, and the cost of providing SCSI capability significantly reduced as described more fully hereinafter.

BRIEF DESCRIPTION OF THE DRAWINGS

Some of the objects of the invention having been stated, other objects will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
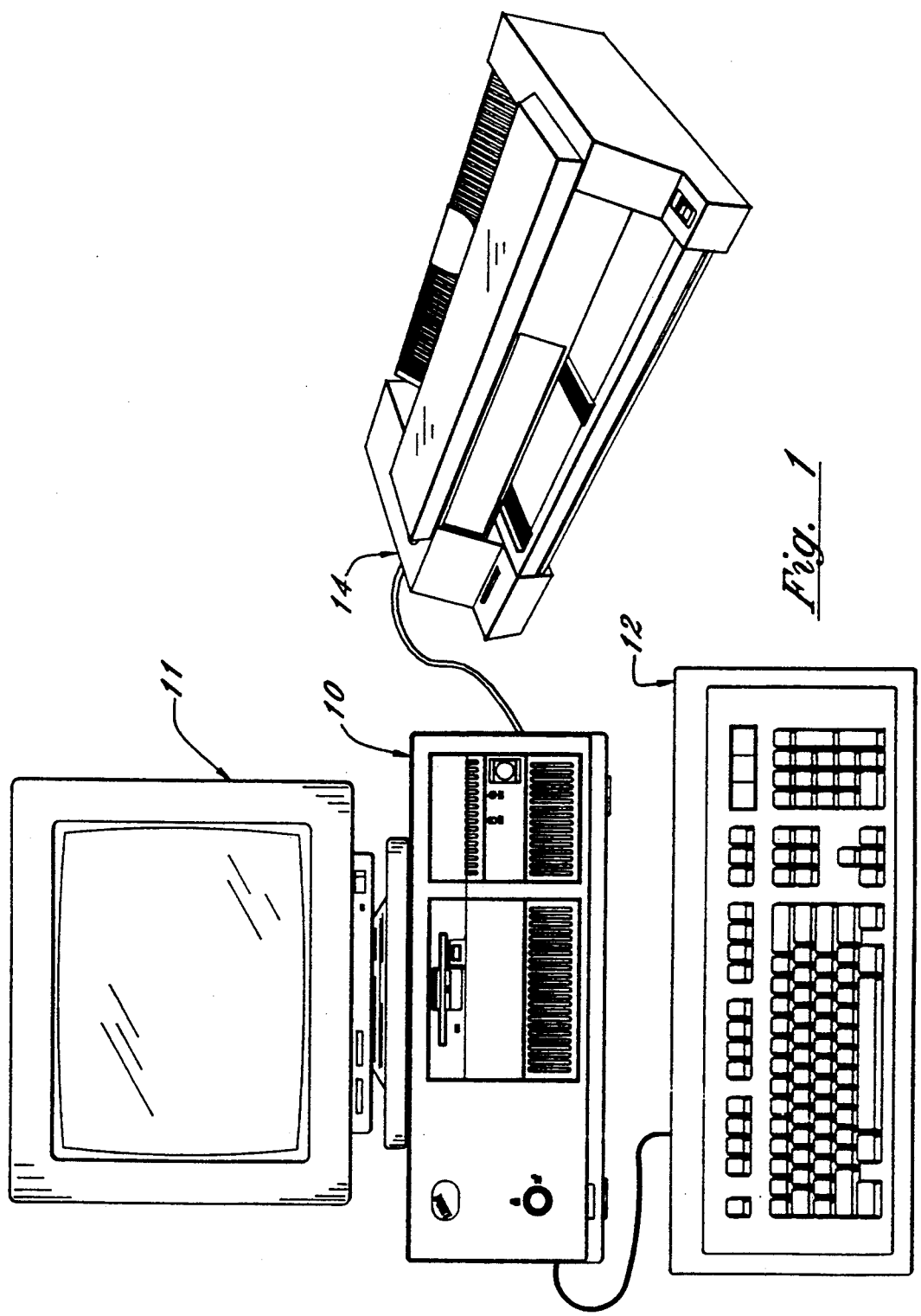
FIG. 1 is a perspective view of a personal computer embodying this invention.
Figure 2:
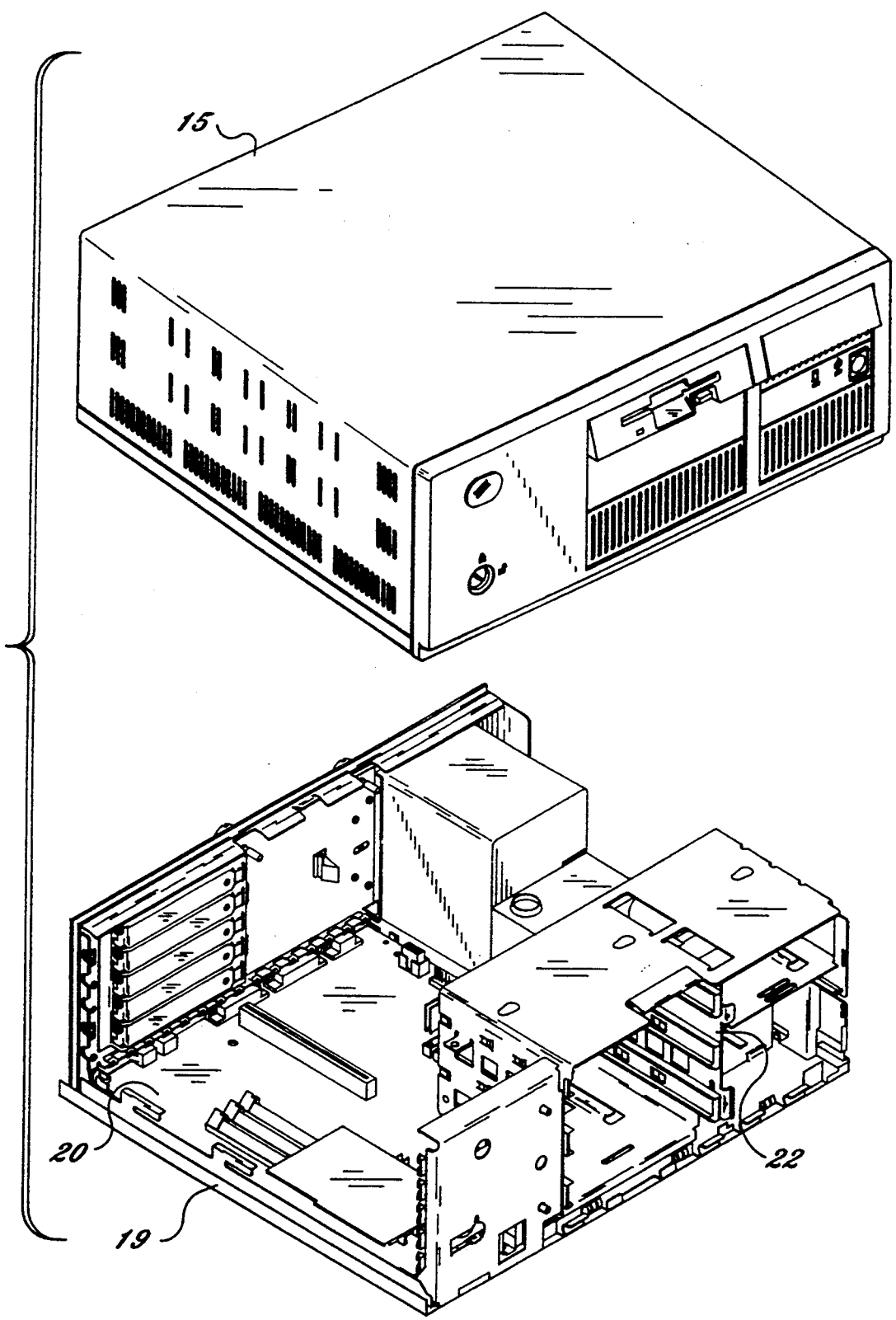
FIG. 2 is an exploded perspective view of certain elements of the personal computer of FIG. 1 including a chassis, a cover, and a planar board and illustrating certain relationships among those elements.

Referring now more particularly to the accompanying drawings, a microcomputer embodying the present invention is there shown and generally indicated at 10 (FIG. 1). As mentioned hereinabove, the computer 10 may have an associated monitor 11, keyboard 12 and printer or plotter 14. The computer 10 has a cover 15 which cooperates with a chassis 19 in defining an enclosed, shielded volume for receiving electrically powered data processing and storage components for processing and storing digital data, as shown in FIG. 2. At least certain of these components are mounted on a multilayer planar 20 or motherboard which is mounted on the chassis 19 and provides a means for electrically interconnecting the components of the computer 10 including those identified above and such other associated elements as floppy disk drives, various forms of direct access storage devices, accessory cards or boards, and the like.

The chassis 19 has a base and a rear panel (FIG. 2) and defines at least one open bay for receiving a data storage device such as a disk drive for magnetic or optical disks, a tape backup drive, or the like. In the illustrated form, an upper bay 22 is adapted to receive peripheral drives of a first size (such as those known as 3.5 inch drives). A floppy disk drive, a removable media direct access storage device capable of receiving a diskette inserted thereinto and using the diskette to receive, store and deliver data as is generally known, may be provided in the upper bay 22.

Figure 3:
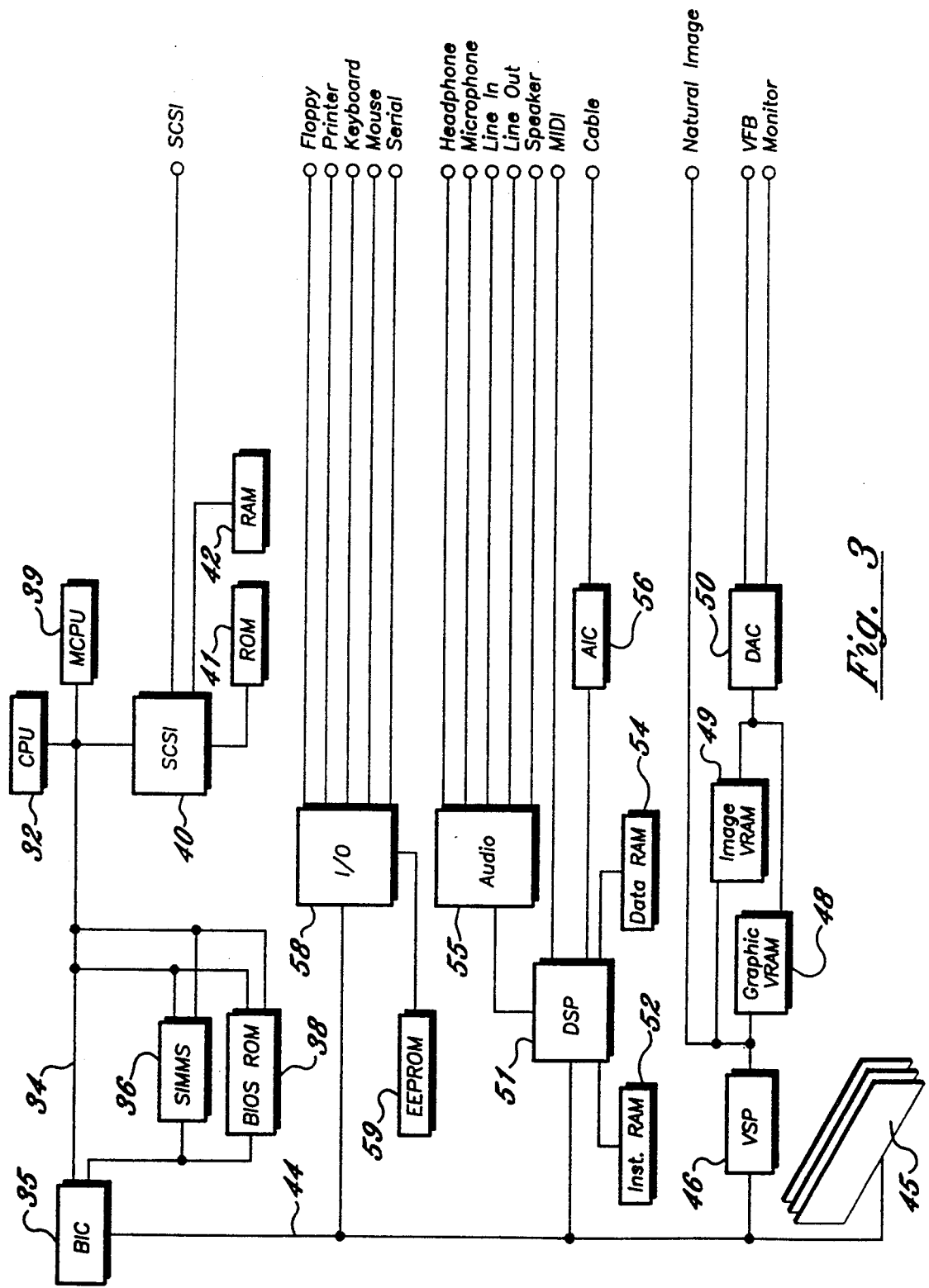
FIG. 3. is a schematic view of certain components of the personal computer of FIGS. 1 and 2.

Prior to relating the above structure to the present invention, a summary of the operation in general of the personal computer system 10 may merit review. Referring to FIG. 3, there is shown a block diagram of a personal computer system illustrating the various components of the computer system such as the system 10 in accordance with the present invention, including components mounted on the planar 20 and the connection of the planar to the I/O slots and other hardware of the personal computer system. Connected to the planar is the system processor 32. While any appropriate microprocessor can be used as the CPU 32, one suitable microprocessor is the 80386 which is sold by INTEL. The CPU 32 is connected by a high speed CPU local bus 34 to a bus interface control unit 35, to volatile random access memory (RAM) 36 here shown as Single Inline Memory Modules (SIMMs) and to BIOS ROM 38 in which is stored instructions for basic input/output operations to the CPU 32. The BIOS ROM 38 includes the BIOS that is used to interface between the I/O devices and the operating system of the microprocessor 32. Instructions stored in ROM 38 can be copied into RAM 36 to decrease the execution time of BIOS.

While the present invention is described hereinafter with particular reference to the system block diagram of FIG. 3, it is to be understood at the outset of the description which follows that it is contemplated that the apparatus and methods in accordance with the present invention may be used with other hardware configurations of the planar board. For example, the system processor could be an Intel 80286 or 80486 microprocessor.

Returning now to FIG. 3, the CPU local bus 34 (comprising data, address and control components) also provides for the connection of the microprocessor 32 with a math coprocessor 39 and a Small Computer Systems Interface (SCSI) controller 40. The SCSI controller 40 may, as is known to persons skilled in the arts of computer design and operation and described hereinabove, be connected or connectable with Read Only Memory (ROM) 41, RAM 42, and suitable external devices of a variety of types as facilitated by the I/O connection indicated to the right in the Figure. The SCSI controller 40 functions as a interface controller in controlling storage memory devices such as fixed or removable media electromagnetic storage devices (also known as hard and floppy disk drives), electro-optical, tape and other storage devices. In accordance with the present invention, the interface controller 40 has certain characteristics and cooperates with other components of the personal computer system 10 as described more fully hereinafter.

The bus interface controller (BIC) 35 couples the CPU local bus 34 with an I/O bus 44. By means of the bus 44, the BIC 35 is coupled with an optional feature bus such as a MICRO CHANNEL bus having a plurality of I/O slots for receiving MICRO CHANNEL adapter cards 45 which may be further connected to an I/0 device or memory (not shown). The I/O bus 44 includes address, data, and control components.

Coupled along the I/O bus 44 are a variety of I/O components such as a video signal processor 46 which is associated with video RAM (VRAM) for storing graphic information (indicated at 48) and for storing image information (indicated at 49). Video signals exchanged with the processor 46 may be passed through a Digital to Analog Converter (DAC) 50 to a monitor or other display device. Provision is also made for connecting the VSP 46 directly with what is here referred to as a natural image input/output, which may take the form of a video recorder/player, camera, etc. The I/O bus 44 is also coupled with a Digital Signal Processor (DSP) 51 which has associated instruction RAM 52 and data RAM 54 available to store software instructions for the processing of signals by the DSP 51 and data involved in such processing. The DSP 51 provides for processing of audio inputs and outputs by the provision of an audio controller 55, and for handling of other signals by provision of an analog interface controller 56. Lastly, the I/O bus 44 is coupled with a input/output controller 58 with associated Electrical Erasable Programmable Read Only Memory (EEPROM) 59 by which inputs and outputs are exchanged with conventional peripherals including floppy disk drives, a printer or plotter 14, keyboard 12, a mouse or pointing device (not shown), and by means of a serial port.

In accordance with this invention, the main system CPU is allowed to access all of the internal registers (as described hereinabove and not shown in FIG. 3) in the interface controller 40. This can be implemented in conjunction with the existing microprocessor interface to the registers, or they can be exclusive and selectable by means of a mode pin. A mode pin is a pin that is tied to either +5 volts or Ground, and causes the chip to operate in one mode or the other continuously. With this change, either interface has full access to the interface controller's internal registers. Thus, in accordance with this invention, the interface controller 40 has internal registers including interface registers and operation registers (as described above) and is operatively connected with the system CPU 32 and a storage device for directing the exchange of data with the storage device. The interface controller 40 has its interface registers accessible to the system CPU 32 for exchanging therewith high level commands directing the handling of data by the storage device, and its operation registers arranged for receiving, storing and delivering low level commands directing interaction with the storage device. The interface controller 40 provides for access by the system CPU 32 to the operation registers and directs the sequencing of CPU access to the interface registers and operation registers as described more fully hereinafter.

The interface controller 40, in accordance with this invention, is controllably settable to one of two states. These states are a first state in which the CPU 32 is selectively switched between operative connection with the interface registers and the operation registers for sequentially exchanging high level commands with the interface registers and low level commands with the operation registers, and a second state in which the interface registers are operatively connected with the CPU 32 and the operation registers are operatively connected with a dedicated interface processor for exchanging low level commands therewith. With that change implemented, the goal of cost and parts count reduction can be realized when desired. That is, the subsystem microprocessor can be omitted with the CPU being used to do low-level processing. This allows omission of the RAM, ROM and oscillator as well, eliminating over half of the components otherwise potentially used in the subsystem.

Choosing to set the interface controller to the first state does present a tradeoff. The system CPU 32 has to perform the functions previously done by the subsystem microprocessor (not shown in FIG. 3). This is not optimal for multitasking. However, in a single-tasking operating system, when there is an outstanding I/O command, the system CPU must wait for it to finish, and cannot do any other work. Rather than waiting idly, the system CPU can be used to drive the SCSI subsystem. Hence, in single tasking operating systems, performance has not been lost, rather, better use has been made of the processing resources available, and total system cost reduced as well.

To be an ideal solution, this subsystem must be software compatible with other SCSI subsystems which would use the interface controller set in the second state described above and a dedicated interface processor as also described above. This means that the basic input/output system (or "BIOS") and device drivers written for existing controllers must work with this controller as well. Obviously, with the CPU doing the low-level processing, this subsystem is radically different from those previously designed. However, this implementation must be made to look the same from a BIOS or device driver viewpoint.

For operating systems that exclusively use the BIOS interface, compatibility is fairly easy to insure by adding the extra code required to drive the subsystem into the existing BIOS code. This guarantees compatibility, since all that must be supported is an Interrupt 13 interface to BIOS.

For operating systems that use their own device drivers to program the SCSI subsystem, compatibility is not so simple. These device drivers do not use the BIOS interface. They program the hardware of the subsystem directly, by writing to the interface registers described in the preceding section. They will then wait for an interrupt indicating that the subsystem has finished processing the command. This, of course, assumes that there is a subsystem microprocessor present in the design.

To solve this problem, it is necessary to "fake out" the device driver, such that there is no apparent difference between a microprocessor driven SCSI subsystem, and the cost reduced one enabled by this invention. To do this, the interrupt signal from the ASIC that would normally go to the subsystem microprocessor is attached to the system CPU. An unused interrupt level is preferred, but if none are available, one that is presently used could be shared, and the CPU could poll to discern the source of the interrupt. Code necessary to drive the subsystem functions would be executed following that interrupt.

Figure 4:
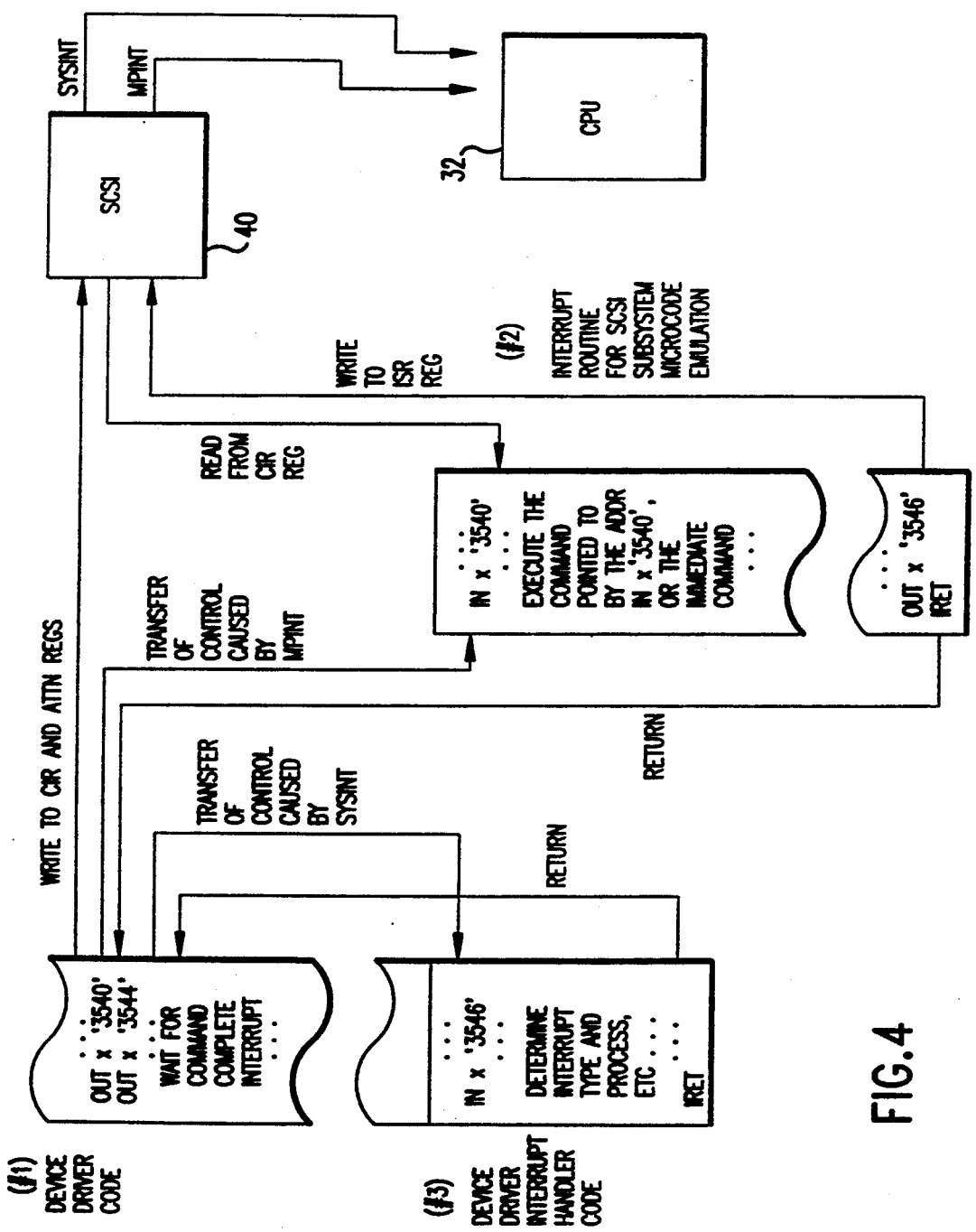
FIG. 4 is a schematic flow chart of the function of an interface controller embodying the present invention.

The flow of such instructions is illustrated in FIG. 5 and will now be described. First, the device driver sends the interface controller 40 a command. This is done by writing the CIR with the address of a Subsystem Command Block, or SCB, and then writing to the ATTN register to activate the interface controller. When the ATTN register is written by the system CPU, the ASIC generates a signal identified here as MPINT. In a traditional design (or with the controller 40 set in the second state described above), this interrupts the subsystem microprocessor, which then performs the steps necessary to complete the command. In the implementation shown (and with the controller 40 set in the first state described above), MPINT is wired to the CPU 32. When interrupted by this source, the CPU 32 will transfer control to a "Subsystem Microcode Emulation Interrupt Routine" illustrated schematically in FIG. 4.

This emulation routine, and the change to the interface controller 40 register access, allows the CPU 32 to perform the functions normally done by the (now absent) subsystem microprocessor. These include all of the timing, protocol and low-level interaction with the SCSI devices. Given that this is a single-tasking system, the time spent by the CPU 32 in doing these functions is time that would otherwise be spent waiting for the subsystem to finish. Therefore, this is a more efficient use of processor resources. In some cases, this implementation could be faster than the traditional approach, because the CPU 32 is much faster than a subsystem microprocessor, and can fetch and translate the commands in less time. When the subsystem functions are complete, the CPU will write to the ISR and cause the interface controller 40 to generate a SYSINT. Ordinarily this would interrupt the CPU immediately, and cause it to branch out of the emulation routine. Therefore, the very end of this routine should be coded such that interrupts are disabled, then the ISR is written, and then interrupts are re-enabled when the CPU returns from the emulation routine.

Immediately after return from the emulation routine, the CPU will again be interrupted out of the main device driver code, this time by a command complete interrupt from the SCSI subsystem. Control is now transferred to the device driver's interrupt routine. When this routine polls the SCSI subsystem registers, it will find that the command has completed, and that status is available exactly as it would be in a conventional design. From the point of view of the device driver, nothing has changed. It is unaffected by the new style of implementation, and will function exactly as it did on any other SCSI subsystem. This SCSI controller implementation represents a significant savings in logic and board space, and hence cost, over the existing SCSI controllers. It is also completely compatible with all other implementations down to the system register interface architecture.

In the drawings and specifications there has been set forth a preferred embodiment of the invention and, although specific terms are used, the description thus given uses terminology in a generic and descriptive sense only and not for purposes of limitation.

What is claimed is:

1. A personal computer system comprising:
    a microprocessor functioning as a system central processing unit,
    a direct access storage device for receiving, storing and delivering digital data, and
    an interface controller having internal registers including interface registers and operation registers, said interface controller being operatively connected with said microprocessor and said storage device for directing the exchange of data with said storage device,
        said interface registers being accessible by said microprocessor for exchanging therewith high level commands directing the handling of data by said storage device,
        said operation registers for receiving, storing and delivering low level commands directing interaction with said storage device, and said controller providing for access by said microprocessor to said operation registers and directing sequencing of microprocessor access to said interface registers and said operation registers.

2. A personal computer system in accordance with claim 1 further comprising a dedicated interface processor operatively connected with said controller for exchanging low level command with said operation registers.

3. A personal computer system comprising:
    a microprocessor functioning as a system central processing unit,
    a direct access storage device for receiving, storing and delivering digital data, and
    an interface controller operatively connected with said microprocessor and said storage device, said interface controller for directing the exchange of data with said storage device and comprising:
        internal interface registers for exchanging with said central processing unit high level commands directing the handling of data by said storage device, and
        internal operation registers for receiving, storing and delivering low level commands directing interaction with said storage device,
    said controller being controllably settable to one of
        a first state in which said central processing unit is selectively switched between operative connection with said interface registers and said operation registers for sequentially exchanging high level commands with said interface registers and low level commands with said operation registers, and
        a second state in which said interface registers are operatively connected with said central processing unit and said operation registers are operatively connected with a dedicated interface processor for exchanging low level commands therewith.

4. A personal computer system in accordance with claim 3 wherein said controller is set to said first state.

5. A personal computer system in accordance with claim 3 further comprising a dedicated interface processor operatively connected with said controller for exchanging low level commands with said operation registers, and further wherein said controller is set to said second state.

6. An interface controller for use in a personal computer system which has a microprocessor functioning as a system central processing unit and a direct access storage device for receiving, storing and delivering digital data, the controller comprising:

internal interface registers for exchanging with a microprocessor functioning as a system central processing unit high level commands directing the handling of data by the storage device, and internal operation registers for receiving, storing and delivering low level commands directing interaction with the storage device, said controller being controllably settable to one of a first state in which the central processing unit is selectively switched between operative connection with said interface registers and said operation registers for sequentially exchanging high level commands with said interface registers and low level commands with said operation registers, and a second state in which said interface registers are operatively connected with the central processing unit and said operation registers are operatively connected with a dedicated interface processor for exchanging low level commands therewith.

* * * * *